(12) United States Patent
Tsuda et al.

(10) Patent No.: US 12,318,973 B2
(45) Date of Patent: Jun. 3, 2025

(54) INJECTION MOLDING METHOD

(71) Applicant: DAIKIN INDUSTRIES, LTD., Osaka (JP)

(72) Inventors: Hayato Tsuda, Osaka (JP); Takahisa Aoyama, Osaka (JP); Tadaharu Isaka, Osaka (JP); Yukari Yamamoto, Osaka (JP); Yumi Zenke, Osaka (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 223 days.

(21) Appl. No.: 17/680,911

(22) Filed: Feb. 25, 2022

(65) Prior Publication Data
US 2022/0266485 A1  Aug. 25, 2022

Related U.S. Application Data

(63) Continuation of application No. PCT/JP2020/032234, filed on Aug. 26, 2020.

(30) Foreign Application Priority Data

Aug. 26, 2019  (JP) .................. 2019-153770

(51) Int. Cl.
*B29C 45/00* (2006.01)
*B29K 27/18* (2006.01)
*B29K 105/00* (2006.01)
*B29L 31/26* (2006.01)

(52) U.S. Cl.
CPC ...... *B29C 45/0001* (2013.01); *B29C 45/0046* (2013.01); *B29K 2027/18* (2013.01); *B29K 2105/0085* (2013.01); *B29K 2995/0097* (2013.01); *B29L 2031/26* (2013.01)

(58) Field of Classification Search
None
See application file for complete search history.

(56) References Cited

U.S. PATENT DOCUMENTS

| | | | |
|---|---|---|---|
| 3,635,926 A | 1/1972 | Gresham et al. | |
| 3,945,786 A | 3/1976 | Bishop | |
| 4,510,300 A | 4/1985 | Levy | |

(Continued)

FOREIGN PATENT DOCUMENTS

| | | |
|---|---|---|
| CN | 1599757 A | 3/2005 |
| CN | 103946250 A | 7/2014 |

(Continued)

OTHER PUBLICATIONS

International Search Report issued Oct. 13, 2020 in International Application No. PCT/JP2020/032236.

(Continued)

*Primary Examiner* — Mathieu D Vargot
(74) *Attorney, Agent, or Firm* — Sughrue Mion, PLLC

(57) ABSTRACT

Provided is an injection molding method for obtaining an injection molded article using an injection molding machine by means of filling a mold cavity of a mold with a molten copolymer from a nozzle of the injection molding machine, wherein the minimum thickness of the mold cavity is 0.8 mm or less, the total projected area of the mold is 1 cm$^2$ or more, and the copolymer is a copolymer containing a tetrafluoroethylene unit and a fluoroalkyl vinyl ether unit, wherein the number of functional groups is 100 or less per $10^6$ main-chain carbon atoms of the copolymer.

11 Claims, 5 Drawing Sheets

(56) References Cited

U.S. PATENT DOCUMENTS

| | | |
|---|---|---|
| 4,743,658 A | 5/1988 | Imbalzano et al. |
| 4,902,444 A | 2/1990 | Kolouch |
| 5,000,875 A | 3/1991 | Kolouch |
| 5,656,392 A | 8/1997 | Sano et al. |
| 5,767,198 A | 6/1998 | Shimizu et al. |
| 5,851,693 A | 12/1998 | Sano et al. |
| 6,069,215 A | 5/2000 | Araki et al. |
| 6,096,795 A | 8/2000 | Abusleme et al. |
| 6,689,833 B1 | 2/2004 | Bidstrup et al. |
| 6,740,375 B1 | 5/2004 | Sagisaka et al. |
| 6,774,196 B1 | 8/2004 | Taira et al. |
| 2002/0011692 A1 | 1/2002 | Lahijani |
| 2002/0099143 A1 | 7/2002 | Namura |
| 2003/0013791 A1 | 1/2003 | Blong et al. |
| 2003/0109646 A1 | 6/2003 | Kubo et al. |
| 2003/0114615 A1 | 6/2003 | Sumi et al. |
| 2003/0190530 A1 | 10/2003 | Yang et al. |
| 2003/0216531 A1 | 11/2003 | Aten et al. |
| 2004/0072935 A1 | 4/2004 | Blong et al. |
| 2004/0102572 A1 | 5/2004 | Kubo et al. |
| 2004/0204536 A1 | 10/2004 | Miyatani et al. |
| 2005/0020792 A1 | 1/2005 | Aoyama et al. |
| 2007/0112155 A1 | 5/2007 | Takase et al. |
| 2007/0149734 A1 | 6/2007 | Sakakibara et al. |
| 2007/0281166 A1 | 12/2007 | Nishio |
| 2008/0038627 A1 | 2/2008 | Yamauchi et al. |
| 2008/0114143 A1 | 5/2008 | Brothers et al. |
| 2009/0038821 A1 | 2/2009 | Sato et al. |
| 2009/0044965 A1 | 2/2009 | Kono et al. |
| 2009/0176952 A1 | 7/2009 | Funaki et al. |
| 2009/0246435 A1 | 10/2009 | Shimono et al. |
| 2010/0063214 A1 | 3/2010 | Kasahara et al. |
| 2010/0212929 A1 | 8/2010 | Ishii et al. |
| 2010/0273047 A1 | 10/2010 | Kunoike et al. |
| 2010/0314153 A1 | 12/2010 | Ishii et al. |
| 2011/0052970 A1 | 3/2011 | Kurata et al. |
| 2011/0052977 A1 | 3/2011 | Kurata et al. |
| 2011/0203830 A1 | 8/2011 | Kono et al. |
| 2011/0272173 A1 | 11/2011 | Shiotsuki et al. |
| 2012/0035329 A1 | 2/2012 | Isogai et al. |
| 2012/0094169 A1 | 4/2012 | Kim et al. |
| 2013/0130100 A1 | 5/2013 | Kurata et al. |
| 2014/0227533 A1 | 8/2014 | Murakami et al. |
| 2014/0287177 A1 | 9/2014 | Suda et al. |
| 2014/0378616 A1 | 12/2014 | Nakano et al. |
| 2015/0041145 A1 | 2/2015 | Colaianna et al. |
| 2015/0148481 A1 | 5/2015 | Brothers et al. |
| 2015/0158988 A1 | 6/2015 | Sawaki et al. |
| 2016/0006004 A1 | 1/2016 | Ogawa et al. |
| 2016/0108159 A1 | 4/2016 | Sekiguchi et al. |
| 2016/0272805 A1 | 9/2016 | Nakanishi et al. |
| 2016/0319089 A1 | 11/2016 | Imamura et al. |
| 2017/0008986 A1 | 1/2017 | Isaka et al. |
| 2017/0025204 A1 | 1/2017 | Chapman et al. |
| 2017/0214037 A1 | 7/2017 | Uematsu et al. |
| 2017/0260344 A1 | 9/2017 | Imamura et al. |
| 2018/0009204 A1 | 1/2018 | Higuchi et al. |
| 2018/0237566 A1 | 8/2018 | Aida et al. |
| 2018/0265654 A1 | 9/2018 | Imamura et al. |
| 2018/0283590 A1 | 10/2018 | Yokoyama et al. |
| 2019/0134939 A1 | 5/2019 | Colaianna et al. |
| 2019/0143628 A1 | 5/2019 | Colaianna et al. |
| 2019/0177453 A1 | 6/2019 | Isaka et al. |
| 2019/0193315 A1 | 6/2019 | Miyamoto et al. |
| 2019/0375929 A1 | 12/2019 | Nishimura et al. |
| 2020/0332037 A1 | 10/2020 | Isaka et al. |
| 2021/0008827 A1 | 1/2021 | Colaianna et al. |
| 2021/0008828 A1 | 1/2021 | Colaianna et al. |
| 2021/0024769 A1 | 1/2021 | Imamura et al. |
| 2021/0189031 A1 | 6/2021 | Hintzer et al. |
| 2021/0269568 A1 | 9/2021 | Imamura et al. |
| 2022/0001657 A1 | 1/2022 | Kikuchi et al. |
| 2022/0033636 A1 | 2/2022 | Nishimura et al. |
| 2022/0170573 A1 | 6/2022 | Imamura et al. |
| 2022/0181689 A1 | 6/2022 | Isaka et al. |
| 2022/0181698 A1 | 6/2022 | Isaka et al. |
| 2022/0181729 A1 | 6/2022 | Isaka et al. |
| 2022/0195088 A1 | 6/2022 | Imamura et al. |
| 2022/0213996 A1 | 7/2022 | Imamura et al. |
| 2022/0278403 A1 | 9/2022 | Isaka et al. |
| 2023/0227594 A1 | 7/2023 | Yamamoto et al. |
| 2023/0235107 A1 | 7/2023 | Isaka et al. |
| 2023/0235159 A1 | 7/2023 | Isaka et al. |
| 2023/0235160 A1 | 7/2023 | Isaka et al. |
| 2023/0238627 A1 | 7/2023 | Isaka et al. |
| 2023/0238628 A1 | 7/2023 | Zenke et al. |
| 2023/0238629 A1 | 7/2023 | Isaka et al. |
| 2023/0272136 A1 | 8/2023 | Zenke et al. |
| 2023/0295356 A1 | 9/2023 | Isaka et al. |
| 2023/0383031 A1 | 11/2023 | Isaka et al. |
| 2023/0383032 A1 | 11/2023 | Isaka et al. |
| 2023/0383033 A1 | 11/2023 | Zenke et al. |
| 2023/0383034 A1 | 11/2023 | Isaka et al. |
| 2023/0390977 A1 | 12/2023 | Hamada et al. |
| 2023/0390978 A1 | 12/2023 | Tsuda et al. |
| 2023/0390979 A1 | 12/2023 | Tsuda et al. |
| 2023/0390980 A1 | 12/2023 | Tsuda et al. |
| 2023/0390981 A1 | 12/2023 | Tsuda et al. |
| 2023/0391909 A1 | 12/2023 | Isaka et al. |
| 2023/0391910 A1 | 12/2023 | Isaka et al. |
| 2023/0391911 A1 | 12/2023 | Isaka et al. |
| 2023/0391912 A1 | 12/2023 | Isaka et al. |
| 2023/0391917 A1 | 12/2023 | Isaka et al. |
| 2023/0391920 A1 | 12/2023 | Isaka et al. |
| 2023/0391927 A1 | 12/2023 | Isaka |
| 2023/0391929 A1 | 12/2023 | Isaka et al. |
| 2023/0391931 A1 | 12/2023 | Isaka et al. |
| 2023/0391932 A1 | 12/2023 | Isaka et al. |
| 2023/0391933 A1 | 12/2023 | Isaka et al. |
| 2023/0392737 A1 | 12/2023 | Tsuda et al. |
| 2023/0395282 A1 | 12/2023 | Isaka et al. |
| 2023/0399431 A1 | 12/2023 | Isaka et al. |
| 2023/0399432 A1 | 12/2023 | Isaka et al. |
| 2023/0399438 A1 | 12/2023 | Isaka et al. |
| 2023/0399441 A1 | 12/2023 | Isaka et al. |
| 2023/0399443 A1 | 12/2023 | Isaka et al. |
| 2023/0406975 A1 | 12/2023 | Isaka et al. |
| 2023/0406976 A1 | 12/2023 | Isaka et al. |
| 2023/0411751 A1 | 12/2023 | Tsuda et al. |
| 2023/0415387 A1 | 12/2023 | Hamada et al. |
| 2025/0002728 A1 | 1/2025 | Zenke et al. |
| 2025/0011488 A1 | 1/2025 | Isaka et al. |
| 2025/0011490 A1 | 1/2025 | Isaka et al. |
| 2025/0011494 A1 | 1/2025 | Isaka et al. |
| 2025/0011496 A1 | 1/2025 | Yamamoto et al. |
| 2025/0011498 A1 | 1/2025 | Isaka et al. |
| 2025/0011499 A1 | 1/2025 | Isaka et al. |
| 2025/0011500 A1 | 1/2025 | Isaka et al. |
| 2025/0019476 A1 | 1/2025 | Isaka et al. |
| 2025/0034302 A1 | 1/2025 | Isaka et al. |

FOREIGN PATENT DOCUMENTS

| | | |
|---|---|---|
| CN | 107428144 A | 12/2017 |
| CN | 110790854 A | 2/2020 |
| CN | 114223086 A | 3/2022 |
| CN | 114258609 A | 3/2022 |
| CN | 116867821 A | 10/2023 |
| EP | 0 220 910 A2 | 5/1987 |
| EP | 0 423 995 A1 | 4/1991 |
| EP | 0 976 544 A1 | 2/2000 |
| EP | 1 462 458 A1 | 9/2004 |
| EP | 4 024 550 A1 | 7/2022 |
| EP | 4 024 575 A1 | 7/2022 |
| EP | 4 223 793 A1 | 8/2023 |
| EP | 4 223 794 A1 | 8/2023 |
| GB | 1210794 A | 10/1970 |
| JP | 48-20788 B1 | 6/1973 |
| JP | 58-132512 A | 8/1983 |
| JP | 58-191127 A | 11/1983 |
| JP | 59-120433 A | 7/1984 |
| JP | 62-104822 A | 5/1987 |
| JP | 1-53167 B2 | 11/1989 |
| JP | 2-129253 A | 5/1990 |

(56) References Cited

FOREIGN PATENT DOCUMENTS

| | | |
|---|---|---|
| JP | 3-184209 A | 8/1991 |
| JP | 3-247609 A | 11/1991 |
| JP | 4-357398 A | 12/1992 |
| JP | 6-1902 A | 1/1994 |
| JP | 6-40813 B2 | 6/1994 |
| JP | 6-287405 A | 10/1994 |
| JP | 7-16869 A | 1/1995 |
| JP | 7-112449 A | 5/1995 |
| JP | 7-188337 A | 7/1995 |
| JP | 7-290496 A | 11/1995 |
| JP | 8-207106 A | 8/1996 |
| JP | 8-321287 A | 12/1996 |
| JP | 9-245832 A | 9/1997 |
| JP | 10-87746 A | 4/1998 |
| JP | 10-275604 A | 10/1998 |
| JP | 10-292054 A | 11/1998 |
| JP | 2001-151825 A | 6/2001 |
| JP | 2001-151826 A | 6/2001 |
| JP | 2001-283907 A | 10/2001 |
| JP | 2001-283921 A | 10/2001 |
| JP | 2002-53620 A | 2/2002 |
| JP | 2002-63934 A | 2/2002 |
| JP | 2002-167488 A | 6/2002 |
| JP | 2003-327770 A | 11/2003 |
| JP | 2003-534940 A | 11/2003 |
| JP | 2004-256406 A | 9/2004 |
| JP | 2004-534131 A | 11/2004 |
| JP | 2005-523979 A | 8/2005 |
| JP | 2005-298659 A | 10/2005 |
| JP | 2005-320497 A | 11/2005 |
| JP | 2006-117912 A | 5/2006 |
| JP | 2006-312736 A | 11/2006 |
| JP | 2007-238960 A | 9/2007 |
| JP | 2008-66254 A | 3/2008 |
| JP | 2009-42478 A | 2/2009 |
| JP | 2009-59690 A | 3/2009 |
| JP | 2009-235564 A | 10/2009 |
| JP | 2009-272207 A | 11/2009 |
| JP | 2010-056079 A | 3/2010 |
| JP | 2010-509443 A | 3/2010 |
| JP | 2010-162817 A | 7/2010 |
| JP | 2011-048976 A | 3/2011 |
| JP | 2011-71104 A | 4/2011 |
| JP | 2012-54269 A | 3/2012 |
| JP | 2012-80911 A | 4/2012 |
| JP | 2012-106494 A | 6/2012 |
| JP | 2012-130557 A | 7/2012 |
| JP | 2013-71341 A | 4/2013 |
| JP | 2013-82888 A | 5/2013 |
| JP | 2013-177574 A | 9/2013 |
| JP | 2014-28951 A | 2/2014 |
| JP | 2014-59052 A | 4/2014 |
| JP | 2014-187040 A | 10/2014 |
| JP | 2015-7218 A | 1/2015 |
| JP | 2015-519410 A | 7/2015 |
| JP | 2015-147924 A | 8/2015 |
| JP | 2015-168840 A | 9/2015 |
| JP | 2016-537499 A | 12/2016 |
| JP | 2017-197690 A | 11/2017 |
| JP | 2018-20468 A | 2/2018 |
| JP | 2018-514598 A | 6/2018 |
| JP | 2018-523272 A | 8/2018 |
| JP | 2018-159090 A | 10/2018 |
| JP | 2019-172962 A | 10/2019 |
| JP | 2019-210420 A | 12/2019 |
| JP | 2019-214641 A | 12/2019 |
| JP | 2020-2341 A | 1/2020 |
| JP | 2020-15906 A | 1/2020 |
| JP | 2020-29042 A | 2/2020 |
| JP | 2020-100823 A | 7/2020 |
| JP | 2020-100843 A | 7/2020 |
| JP | 2021-6648 A | 1/2021 |
| JP | 2021-141043 A | 9/2021 |
| JP | 2021-141045 A | 9/2021 |
| JP | 2022-19196 A | 1/2022 |
| KR | 10-2004-0071160 A | 8/2004 |
| KR | 10-2019-0034205 A | 4/2019 |
| WO | 95/29956 A1 | 11/1995 |
| WO | 01/40331 A1 | 6/2001 |
| WO | 03/006566 A1 | 1/2003 |
| WO | 03/048214 A1 | 6/2003 |
| WO | 2004/052987 A1 | 6/2004 |
| WO | 2008/032613 A1 | 3/2008 |
| WO | 2008/047759 A1 | 4/2008 |
| WO | 2008/047906 A1 | 4/2008 |
| WO | 2008/143069 A1 | 11/2008 |
| WO | 2010/113864 A1 | 10/2010 |
| WO | 2013/115374 A1 | 8/2013 |
| WO | 2014/007346 A1 | 1/2014 |
| WO | 2014/129413 A1 | 8/2014 |
| WO | 2015/119053 A1 | 8/2015 |
| WO | 2016/117492 A1 | 7/2016 |
| WO | 2017/056203 A1 | 4/2017 |
| WO | 2017/082417 A1 | 5/2017 |
| WO | 2019/003265 A1 | 1/2019 |
| WO | 2020/004083 A1 | 1/2020 |
| WO | 2020/090981 A1 | 5/2020 |
| WO | 2020/204163 A1 | 10/2020 |
| WO | 2021/033539 A1 | 2/2021 |
| WO | 2021/039862 A1 | 3/2021 |
| WO | 2021/039863 A1 | 3/2021 |
| WO | 2021/039865 A1 | 3/2021 |
| WO | 2021039864 A1 | 3/2021 |
| WO | 2021/059753 A1 | 4/2021 |
| WO | 2022/181225 A1 | 9/2022 |

OTHER PUBLICATIONS

International Search Report issued Oct. 13, 2020 in International Application No. PCT/JP2020/032237.
International Search Report issued Oct. 13, 2020 in International Application No. PCT/JP2020/032238.
International Search Report issued Oct. 13, 2020 in International Application No. PCT/JP2020/032239.
International Preliminary Report on Patentability with Written Opinion dated Mar. 1, 2022 in International Application No. PCT/JP2020/032234.
International Preliminary Report on Patentability with Written Opinion dated Mar. 1, 2022 in International Application No. PCT/JP2020/032236.
International Preliminary Report on Patentability with Written Opinion dated Mar. 1, 2022 in International Application No. PCT/JP2020/032237.
International Preliminary Report on Patentability with Written Opinion dated Mar. 1, 2022 in International Application No. PCT/JP2020/032238.
International Preliminary Report on Patentability with Written Opinion dated Mar. 1, 2022 in International Application No. PCT/JP2020/032239.
International Preliminary Report on Patentability, with Translation of Written Opinion issued Mar. 28, 2023 in International Application No. PCT/JP2021/036301.
International Preliminary Report on Patentability, with Translation of Written Opinion issued Mar. 28, 2023 in International Application No. PCT/JP2021/036302.
International Preliminary Report on Patentability, with Translation of Written Opinion issued Mar. 28, 2023 in International Application No. PCT/JP2021/036303.
International Preliminary Report on Patentability, with Translation of Written Opinion issued Mar. 28, 2023 in International Application No. PCT/JP2021/036304.
International Preliminary Report on Patentability, with Translation of Written Opinion issued Mar. 28, 2023 in International Application No. PCT/JP2021/036305.
International Preliminary Report on Patentability, with Translation of Written Opinion issued Mar. 28, 2023 in International Application No. PCT/JP2021/036306.
International Preliminary Report on Patentability, with Translation of Written Opinion issued Mar. 28, 2023 in International Application No. PCT/JP2021/036307.

(56) References Cited

OTHER PUBLICATIONS

International Preliminary Report on Patentability, with Translation of Written Opinion issued Mar. 28, 2023 in International Application No. PCT/JP2021/036308.
International Preliminary Report on Patentability, with Translation of Written Opinion issued Mar. 28, 2023 in International Application No. PCT/JP2021/036309.
International Preliminary Report on Patentability, with Translation of Written Opinion issued Mar. 28, 2023 in International Application No. PCT/JP2021/036310.
Extended European Search Report issued Aug. 2, 2023 in European Application No. 20857704.9.
International Preliminary Report on Patentability dated Aug. 29, 2023 with a Translation of the Written Opinion of the International Searching Authority in Application No. PCT/JP2022/003634.
International Preliminary Report on Patentability dated Aug. 29, 2023 with a Translation of the Written Opinion of the International Searching Authority in Application No. PCT/JP2022/003635.
International Preliminary Report on Patentability dated Aug. 29, 2023 with a Translation of the Written Opinion of the International Searching Authority in Application No. PCT/JP2022/003636.
International Preliminary Report on Patentability dated Aug. 29, 2023 with a Translation of the Written Opinion of the International Searching Authority in Application No. PCT/JP2022/003637.
International Preliminary Report on Patentability dated Aug. 29, 2023 with a Translation of the Written Opinion of the International Searching Authority in Application No. PCT/JP2022/003638.
International Preliminary Report on Patentability dated Aug. 29, 2023 with a Translation of the Written Opinion of the International Searching Authority in Application No. PCT/JP2022/003640.
International Preliminary Report on Patentability dated Aug. 29, 2023 with a Translation of the Written Opinion of the International Searching Authority in Application No. PCT/JP2022/003641.
International Preliminary Report on Patentability dated Aug. 29, 2023 with a Translation of the Written Opinion of the International Searching Authority in Application No. PCT/JP2022/003642.
International Preliminary Report on Patentability dated Aug. 29, 2023 with a Translation of the Written Opinion of the International Searching Authority in Application No. PCT/JP2022/003643.
International Preliminary Report on Patentability dated Aug. 29, 2023 with a Translation of the Written Opinion of the International Searching Authority in Application No. PCT/JP2022/003644.
International Preliminary Report on Patentability dated Aug. 29, 2023 with a Translation of the Written Opinion of the International Searching Authority in Application No. PCT/JP2022/003645.
International Preliminary Report on Patentability dated Aug. 29, 2023 with a Translation of the Written Opinion of the International Searching Authority in Application No. PCT/JP2022/003646.
International Preliminary Report on Patentability dated Aug. 29, 2023 with a Translation of the Written Opinion of the International Searching Authority in Application No. PCT/JP2022/003647.
International Preliminary Report on Patentability dated Aug. 29, 2023 with a Translation of the Written Opinion of the International Searching Authority in Application No. PCT/JP2022/003648.
International Preliminary Report on Patentability dated Aug. 29, 2023 with a Translation of the Written Opinion of the International Searching Authority in Application No. PCT/JP2022/003649.
International Preliminary Report on Patentability dated Aug. 29, 2023 with a Translation of the Written Opinion of the International Searching Authority in Application No. PCT/JP2022/003650.
International Preliminary Report on Patentability dated Aug. 29, 2023 with a Translation of the Written Opinion of the International Searching Authority in Application No. PCT/JP2022/003651.
International Preliminary Report on Patentability dated Aug. 29, 2023 with a Translation of the Written Opinion of the International Searching Authority in Application No. PCT/JP2022/003652.
International Preliminary Report on Patentability dated Aug. 29, 2023 with a Translation of the Written Opinion of the International Searching Authority in Application No. PCT/JP2022/003653.
International Preliminary Report on Patentability dated Aug. 29, 2023 with a Translation of the Written Opinion of the International Searching Authority in Application No. PCT/JP2022/003654.
International Preliminary Report on Patentability dated Aug. 29, 2023 with a Translation of the Written Opinion of the International Searching Authority in Application No. PCT/JP2022/003657.
International Preliminary Report on Patentability dated Aug. 29, 2023 with a Translation of the Written Opinion of the International Searching Authority in Application No. PCT/JP2022/003658.
International Preliminary Report on Patentability dated Aug. 29, 2023 with a Translation of the Written Opinion of the International Searching Authority in Application No. PCT/JP2022/003659.
International Preliminary Report on Patentability dated Aug. 29, 2023 with a Translation of the Written Opinion of the International Searching Authority in Application No. PCT/JP2022/003660.
International Preliminary Report on Patentability dated Aug. 29, 2023 with a Translation of the Written Opinion of the International Searching Authority in Application No. PCT/JP2022/003661.
International Preliminary Report on Patentability dated Aug. 29, 2023 with a Translation of the Written Opinion of the International Searching Authority in Application No. PCT/JP2022/003664.
International Preliminary Report on Patentability dated Aug. 29, 2023 with a Translation of the Written Opinion of the International Searching Authority in Application No. PCT/JP2022/003665.
International Preliminary Report on Patentability dated Aug. 29, 2023 with a Translation of the Written Opinion of the International Searching Authority in Application No. PCT/JP2022/007735.
International Preliminary Report on Patentability dated Aug. 29, 2023 with a Translation of the Written Opinion of the International Searching Authority in Application No. PCT/JP2022/007737.
International Preliminary Report on Patentability dated Aug. 29, 2023 with a Translation of the Written Opinion of the International Searching Authority in Application No. PCT/JP2022/007738.
Translation of the International Search Report dated Jun. 20, 2023 in International Application No. PCT/JP2023/013284.
Translation of the International Search Report dated Jun. 6, 2023 in International Application No. PCT/JP2023/013285.
Translation of the International Search Report dated Jun. 6, 2023 in International Application No. PCT/JP2023/013289.
Translation of the International Search Report dated Jun. 6, 2023 in International Application No. PCT/JP2023/013291.
Translation of the International Search Report dated Jun. 6, 2023 in International Application No. PCT/JP2023/013292.
Translation of the International Search Report dated Jun. 6, 2023 in International Application No. PCT/JP2023/013293.
Translation of the International Search Report dated Jun. 6, 2023 in International Application No. PCT/JP2023/013331.
Translation of the International Search Report dated Jun. 6, 2023 in International Application No. PCT/JP2023/013332.
Translation of the International Search Report dated Jun. 6, 2023 in International Application No. PCT/JP2023/013333.
Translation of the International Search Report dated Jun. 20, 2023 in International Application No. PCT/JP2023/013290.
European Search Report issued Oct. 20, 2023 for European Patent Application No. 20 856 953.3.
European Search Report issued Oct. 20, 2023 for European Patent Application No. 20 857 574.6.
European Search Report issued Oct. 20, 2023 for European Patent Application No. 20 857 843.5.
European Search Report issued Oct. 20, 2023 for European Patent Application No. 20 857 470.7.
International Search Report of PCT/JP2020/032234 dated Oct. 6, 2020 [PCT/ISA/210].
Translation of the International Search Report dated Dec. 21, 2021 in International Application No. PCT/JP2021/036301.
Translation of the International Search Report dated Dec. 21, 2021 in International Application No. PCT/JP2021/036302.
Translation of the International Search Report dated Dec. 21, 2021 in International Application No. PCT/JP2021/036303.
Translation of the International Search Report dated Nov. 9, 2021 in International Application No. PCT/JP2021/036304.
Translation of the International Search Report dated Apr. 12, 2022 in International Application No. PCT/JP2022/003643.

(56) References Cited

OTHER PUBLICATIONS

Translation of the International Search Report dated Nov. 1, 2021 in International Application No. PCT/JP2021/036305.
Translation of the International Search Report dated Nov. 22, 2021 in International Application No. PCT/JP2021/036306.
Translation of the International Search Report dated Nov. 22, 2021 in International Application No. PCT/JP2021/036307.
Translation of the International Search Report dated Nov. 22, 2021 in International Application No. PCT/JP2021/036308.
Translation of the International Search Report dated Nov. 22, 2021 in International Application No. PCT/JP2021/036309.
Translation of the International Search Report dated Nov. 22, 2021 in International Application No. PCT/JP2021/036310.
Translation of the International Search Report dated Apr. 19, 2022 in International Application No. PCT/JP2022/003634.
Translation of the International Search Report dated Apr. 19, 2022 in International Application No. PCT/JP2022/003636.
Translation of the International Search Report dated Apr. 5, 2022 in International Application No. PCT/JP2022/003637.
Translation of the International Search Report dated Apr. 5, 2022 in International Application No. PCT/JP2022/003638.
Translation of the International Search Report dated Apr. 5, 2022 in International Application No. PCT/JP2022/003640.
Translation of the International Search Report dated Apr. 5, 2022 in International Application No. PCT/JP2022/003641.
Translation of the International Search Report dated Apr. 12, 2022 in International Application No. PCT/JP2022/003642.
Translation of the International Search Report dated Apr. 19, 2022 in International Application No. PCT/JP2022/003644.
Translation of the International Search Report dated Apr. 19, 2022 in International Application No. PCT/JP2022/003645.
Translation of the International Search Report dated Apr. 12, 2022 in International Application No. PCT/JP2022/003646.
Translation of the International Search Report dated Apr. 12, 2022 in International Application No. PCT/JP2022/003647.
Translation of the International Search Report dated Mar. 8, 2022 in International Application No. PCT/JP2022/003648.
Translation of the International Search Report dated Apr. 19, 2022 in International Application No. PCT/JP2022/003649.
Translation of the International Search Report dated Apr. 19, 2022 in International Application No. PCT/JP2022/003650.
Translation of the International Search Report dated Apr. 19, 2022 in International Application No. PCT/JP2022/003651.
Translation of the International Search Report dated Mar. 22, 2022 in International Application No. PCT/JP2022/003652.
Translation of the International Search Report dated Apr. 19, 2022 in International Application No. PCT/JP2022/003653.
Translation of the International Search Report dated Apr. 19, 2022 in International Application No. PCT/JP2022/003654.
Translation of the International Search Report dated Mar. 22, 2022 in International Application No. PCT/JP2022/003657.
Translation of the International Search Report dated Mar. 22, 2022 in International Application No. PCT/JP2022/003658.
Translation of the International Search Report dated Apr. 19, 2022 in International Application No. PCT/JP2022/003659.
Translation of the International Search Report dated Mar. 8, 2022 in International Application No. PCT/JP2022/003660.
Translation of the International Search Report dated Mar. 15, 2022 in International Application No. PCT/JP2022/003661.
Translation of the International Search Report dated Apr. 19, 2022 in International Application No. PCT/JP2022/003664.
Translation of the International Search Report dated Apr. 19, 2022 in International Application No. PCT/JP2022/003665.
Translation of the International Search Report dated May 24, 2022 in International Application No. PCT/JP2022/007735.
Translation of the International Search Report dated May 17, 2022 in International Application No. PCT/JP2022/007737.
Translation of the International Search Report dated May 10, 2022 in International Application No. PCT/JP2022/007738.
Translation of the International Search Report dated Apr. 19, 2022 in International Application No. PCT/JP2022/003635.
International Search Report dated Jun. 20, 2023 in International Application No. PCT/JP2023/013284.
International Search Report dated Jun. 6, 2023 in International Application No. PCT/JP2023/013285.
International Search Report dated Jun. 6, 2023 for International Application No. PCT/JP2023/013289.
International Search Report dated Jun. 20, 2023 for International Application No. PCT/JP2023/013290.
International Search Report dated Jun. 6, 2023 for International Application No. PCT/JP2023/013291.
International Search Report dated Jun. 6, 2023 for International Application No. PCT/JP2023/013292.
International Search Report dated Jun. 6, 2023 for International Application No. PCT/JP2023/013293.
International Search Report dated Jun. 6, 2023 for International Application No. PCT/JP2023/013331.
International Search Report dated Jun. 6, 2023 for International Application No. PCT/JP2023/013332.
International Search Report dated Jun. 6, 2023 for International Application No. PCT/JP2023/013333.
International Preliminary Report on Patentability, with Translation of Written Opinion issued Sep. 24, 2024 in International Application No. PCT/JP2023/013284.
International Preliminary Report on Patentability, with Translation of Written Opinion issued Sep. 24, 2024 in International Application No. PCT/JP2023/013285.
International Preliminary Report on Patentability, with Translation of Written Opinion issued Sep. 24, 2024 in International Application No. PCT/JP2023/013289.
International Preliminary Report on Patentability, with Translation of Written Opinion issued Sep. 24, 2024 in International Application No. PCT/JP2023/013290.
International Preliminary Report on Patentability, with Translation of Written Opinion issued Sep. 24, 2024 in International Application No. PCT/JP2023/013291.
International Preliminary Report on Patentability, with Translation of Written Opinion issued Sep. 24, 2024 in International Application No. PCT/JP2023/013292.
International Preliminary Report on Patentability, with Translation of Written Opinion issued Sep. 24, 2024 in International Application No. PCT/JP2023/013293.
International Preliminary Report on Patentability, with Translation of Written Opinion issued Sep. 24, 2024 in International Application No. PCT/JP2023/013331.
International Preliminary Report on Patentability, with Translation of Written Opinion issued Sep. 24, 2024 in International Application No. PCT/JP2023/013332.
International Preliminary Report on Patentability, with Translation of Written Opinion issued Sep. 24, 2024 in International Application No. PCT/JP2023/013333.
European Search Report issued Aug. 27, 2024 for European Patent Application No. 21875831.6.
European Search Report issued Aug. 27, 2024 for European Patent Application No. 21875832.4.
European Search Report issued Aug. 29, 2024 for European Patent Application No. 21875833.2.
European Search Report issued Aug. 29, 2024 for European Patent Application No. 21875834.0.
European Search Report issued Sep. 9, 2024 for European Patent Application No. 21875826.6.
European Search Report issued Sep. 9, 2024 for European Patent Application No. 21875828.2.
European Search Report issued Sep. 9, 2024 for European Patent Application No. 21875829.0.
European Search Report issued Sep. 9, 2024 for European Patent Application No. 21875830.8.
European Search Report issued Sep. 10, 2024 for European Patent Application No. 21875835.7.
European Search Report issued Sep. 19, 2024 for European Patent Application No. 21875827.4.

(56) References Cited

OTHER PUBLICATIONS

European Search Report issued Dec. 4, 2024 for European Patent Application No. 22759287.0.
European Search Report issued Dec. 5, 2024 for European Patent Application No. 22759265.6.
European Search Report issued Dec. 10, 2024 for European Patent Application No. 22759267.2.
European Search Report issued Dec. 13, 2024 for European Patent Application No. 22 759 272.2.
European Search Report issued Dec. 16, 2024 for European Patent Application No. 22759276.3.
European Search Report issued Dec. 13, 2024 for European Patent Application No. 22759273.0.
European Search Report issued Dec. 19, 2024 for European Patent Application No. 22759264.9.
European Search Report issued Dec. 19, 2024 for European Patent Application No. 22759277.1.
European Search Report issued Jan. 2, 2025 for European Patent Application No. 22759281.3.
European Search Report issued Jan. 3, 2025 for European Patent Application No. 22759261.5.
European Search Report issued Jan. 3, 2025 for European Patent Application No. 22759274.8.
European Search Report issued Jan. 16, 2025 for European Patent Application No. 22759269.8.
European Search Report issued Jan. 14, 2025 for European Patent Application No. 22759282.1.
European Search Report issued Jan. 14, 2025 for European Patent Application No. 22759262.3.
European Search Report issued Jan. 16, 2025 for European Patent Application No. 22759284.7.
European Search Report issued Jan. 27, 2025 for European Patent Application No. 22759268.0.
European Search Report issued Jan. 27, 2025 for European Patent Application No. 22759285.4.
European Search Report issued Feb. 4, 2025 for European Patent Application No. 22759266.4.
Paolo Corbelli, "ASTM D638: tensile test for plastics", Jul. 30, 2024, XP093227725, Retrieved from the Internet: URL:https://www.cermacsrl.com/en/astm-d638-tensile-test-for-plastics/, pp. 1-9 (9 total pages).
Keun Park et al., "Eliminating weldlines of an injection-molded part with the aid of high-frequency induction heating", Journal of Mechanical Science and Technology, vol. 24, No. 1, XP055158055, 2010, pp. 149-152 (4 total pages).
Nanyang Zhao et al, "In situ flow state characterization of molten resin at the inner mold in injection molding", Journal of Applied Polymer Science, John Wiley & Sons, Inc, US, vol. 141, No. 9, XP072571824, 2023, pp. 1-16 (16 total pages).
European Search Report issued Feb. 10, 2025 for European Patent Application No. 22759283.9.
European Search Report issued Feb. 20, 2025 for European Patent Application No. 22759263.1.

INJECTION MOLDING METHOD

CROSS-REFERENCE TO RELATED APPLICATIONS

This application is a Rule 53(b) Continuation of International Application No. PCT/JP2020/032234 filed Aug. 26, 2020, which claims priority based on Japanese Patent Application No. 2019-153770 filed Aug. 26, 2019, the respective disclosures of which are incorporated herein by reference in their entirety.

TECHNICAL FIELD

The present disclosure relates to an injection molding method for tetrafluoroethylene/fluoroalkyl vinyl ether copolymer.

BACKGROUND ART

Patent Literature 1 describes a flat non-aqueous electrolytic solution secondary battery in which a positive electrode, a negative electrode, a separator, and a non-aqueous electrolytic solution are stored in a battery container consisting of a battery case, a sealing plate, and a gasket, wherein the material of the gasket is a tetrafluoroethylene perfluoroalkyl vinyl ether copolymer (PFA resin) having a fluorine content of 70 mol % or more and 85 mol % or less, and a melt flow rate (MFR) of 20 g/10 minutes or more and 45 g/10 minutes or less. Patent Document 1 also discloses that using a PFA resin having a fluorine content of 70 mol % or more and 85 mol % or less, and a melt flow rate (MFR) of 20 g/10 minutes or more and 45 g/10 minutes or less as the gasket material enables to suppress gasket surface peeling and gasket shape variation even when injection molding is carried out.

CITATION LIST

Patent Literature

Patent Literature 1: Japanese Patent Laid-Open No. 2010-56079

SUMMARY

The present disclosure provides an injection molding method for obtaining an injection molded article using an injection molding machine by means of filling a mold cavity of a mold with a molten copolymer from a nozzle of the injection molding machine, wherein a minimum thickness of the mold cavity is 0.8 mm or less, and a total projected area of the mold is 1 cm$^2$ or more, and the copolymer is a copolymer containing a tetrafluoroethylene unit and a fluoroalkyl vinyl ether unit, wherein the number of functional groups is 100 or less per 10$^6$ main-chain carbon atoms of the copolymer.

Effects

The present disclosure can provide an injection molding method for a copolymer containing a tetrafluoroethylene unit and a fluoroalkyl vinyl ether unit, which can suppress corrosion of a mold.

DESCRIPTION OF EMBODIMENTS

Figure 1:
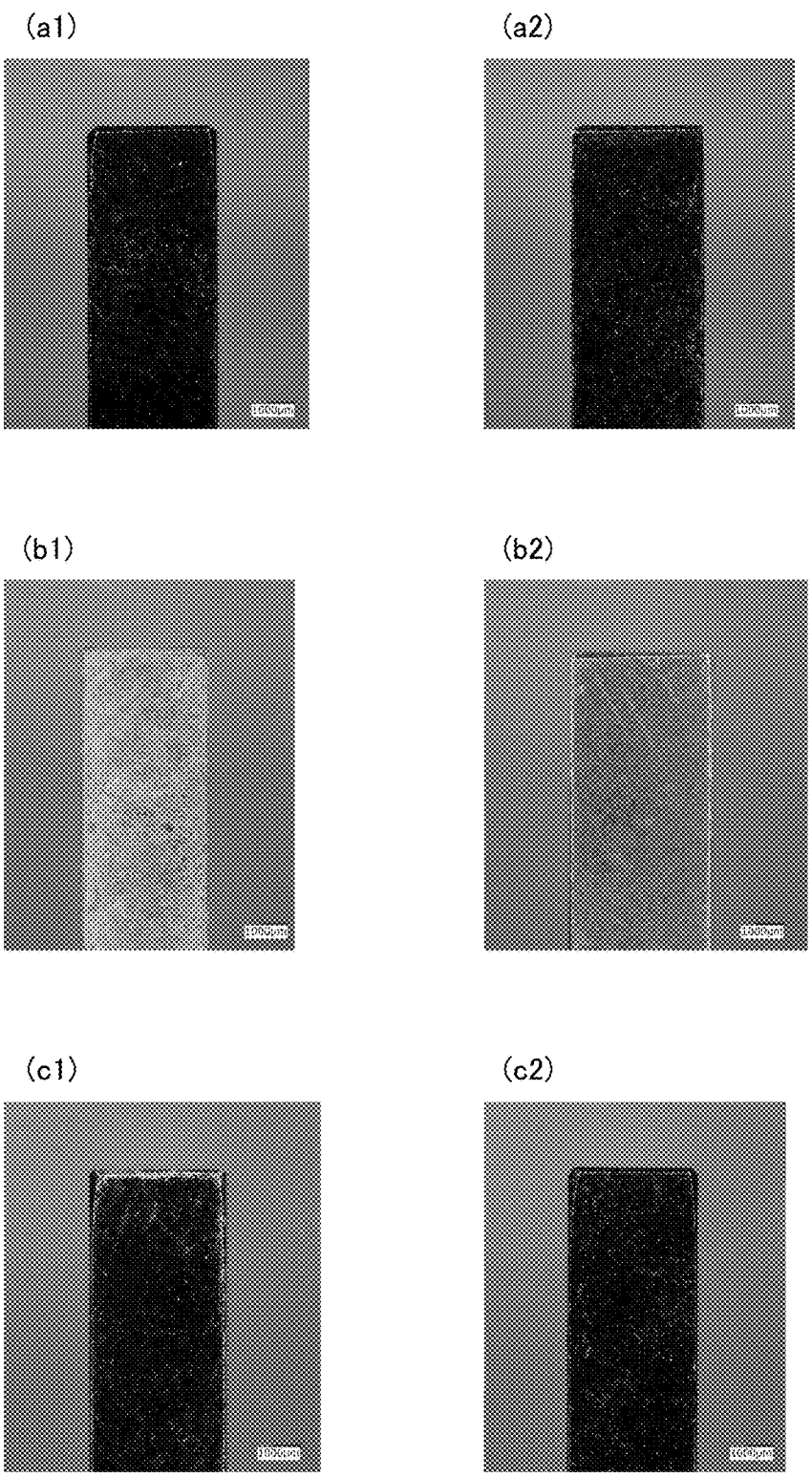
FIG. 1 is photographs of metal posts before (photographs (a1) and (a2)) and after (photographs (b1), (b2), (c1), and (c2)) metal corrosion tests in Example 1 and Comparative Example 1.

Hereinafter, specific embodiments of the present disclosure will be described in detail, but the present disclosure is not limited to the following embodiments.

The present disclosure relates to an injection molding method for obtaining an injection molded article by melting a copolymer (TFE/FAVE copolymer) containing a tetrafluoroethylene (TFE) unit and a fluoroalkyl vinyl ether (FAVE) unit, and filling a mold cavity of a mold with the molten copolymer using an injection molding machine.

In the injection molding method of the present disclosure, for example, the copolymer is heated to its melting point or higher temperature in the cylinder of the injection molding machine, and the molten copolymer is injected and filled from a nozzle of the injection molding machine into the mold cavity of the mold. In this process, it is necessary to fill the mold with a copolymer having high fluidity at high temperature, since the smaller the minimum thickness of the mold cavity is, the higher the flow resistance during copolymer filling is and the higher the cooling solidification rate is. Furthermore, it is necessary to fill the mold with a copolymer having high fluidity at high temperature, since the larger the projected area of the mold is, the longer the distance from the nozzle of the injection molding machine to the end of the mold cavity is.

In the injection molding method of the present disclosure, the mold to be used is a mold having a minimum thickness of the mold cavity of 0.8 mm or less and a total projected area of the mold of 1 cm$^2$ or more. Therefore, in the injection molding method of the present disclosure, it is necessary to fill the mold cavity with a molten, high-temperature copolymer.

For example, the temperature of the copolymer at the nozzle of the injection molding machine in the injection molding method of the present disclosure is preferably 370° C. or higher, more preferably 380° C. or higher, even more preferably 390° C. or higher, and particularly preferably 400° C. or higher, and the upper limit is not limited but is 420° C. or lower.

The temperature of the mold in the cavity part is preferably 130° C. or higher, more preferably 150° C. or higher, even more preferably 180° C. or higher, and particularly preferably 200° C. or higher, and the upper limit is not limited but is 230° C. or lower. The temperature of the mold may be controlled by a heater, a heat medium, or the like.

The cylinder temperature of the injection molding machine is preferably 350° C. or higher. Furthermore, the highest cylinder temperature of the injection molding machine is preferably 380° C. or higher and more preferably 385° C. or higher. By adjusting the cylinder temperature appropriately, it is possible to adjust the temperature of the copolymer at the nozzle of the injection molding machine to the range described above.

The molten high-temperature TFE/FAVE copolymer tends to generate a corrosive gas that can corrode metal. The mold of the injection molding machine for the TFE/FAVE copolymer often has an anti-corrosion coating foiled thereon, but even when a mold with an anti-corrosion coating is used, a corrosive gas may corrode the mold. Thus, it is required to develop technology to suppress the corrosion of the mold.

Under such circumstances, the present inventors have conducted a thorough investigation and found that the corrosion of the mold can be successfully suppressed by setting the number of functional groups per $10^6$ main-chain carbon atoms of the TFE/FAVE copolymer to 100 or less.

The number of functional groups per $10^6$ main-chain carbon atoms of the copolymer used in the injection molding method of the present disclosure is 100 or less. Since the injection molding method of the present disclosure uses a copolymer having a functional group of 100 or less per $10^6$ main-chain carbon atoms, it is possible to suppress the corrosion of the mold even when using a multiple-piece mold for molding a large number of thin injection molded articles or a one-piece mold for molding thin and large injection molded articles.

The number of functional groups per $10^6$ main-chain carbon atoms of the copolymer is 100 or less, and preferably 80 or less, more preferably 50 or less, and even more preferably 20 or less since corrosion of the mold can be further suppressed.

Infrared spectroscopy can be used to identify the types of the functional groups and to measure the number of the functional groups.

Specifically, the number of functional groups is measured by the following method. First, the copolymer is molded by cold pressing to obtain a film with a thickness of 0.25 to 0.3 mu. This film is analyzed by Fourier transform infrared spectroscopy to obtain an infrared absorption spectrum, and a difference spectrum against a base spectrum that is completely fluorinated and has no functional groups is obtained. From the absorption peak of a specific functional group appearing in this difference spectrum, the number of functional groups N per $1\times10^6$ carbon atoms in the copolymer is calculated according to the following formula (A).

$$N = I \times K / t \quad (A)$$

I: Absorbance
K: Correction coefficient
t: Thickness of film (mm)

For reference, Table 1 shows the absorption frequency, the molar absorption coefficient, and the correction coefficient for the functional groups in the present disclosure. The molar absorption coefficients are determined from FT-IR measurement data of low molecular weight model compounds.

TABLE 1

| Functional Group | Absorption Frequency (cm$^{-1}$) | Molar Extinction Coefficient | Correction Factor | Model Compound |
|---|---|---|---|---|
| —COF | 1883 | 600 | 388 | $C_7F_{15}COF$ |
| —COOH free | 1815 | 530 | 439 | $H(CF_2)_6COOH$ |
| —COOH bonded | 1779 | 530 | 439 | $H(CF_2)_6COOH$ |
| —COOCH$_3$ | 1795 | 680 | 342 | $C_7F_{15}COOCH_3$ |
| —CONH$_2$ | 3436 | 506 | 460 | $C_7H_{15}CONH_2$ |
| —CH$_2$OH$_2$, —OH | 3648 | 104 | 2236 | $C_7H_{15}CH_2OH$ |
| —CF$_2$H | 3020 | 8.8 | 26485 | $H(CF_2CF_2)_3CH_2OH$ |
| —CF═CF$_2$ | 1795 | 635 | 366 | $CF_2$═$CF_2$ |

Note that the absorption frequencies of —CH$_2$CF$_2$H, —CH$_2$COF, —CH$_2$COOH, —CH$_2$COCCH$_3$, and —CH$_2$CONH$_2$ are several tens of kaysers (cm$^{-1}$) lower than those of —CF$_2$H, —COF, —COOH free and —COOH bonded, —COOCH$_3$, and —CONH$_2$ shown in the table, respectively.

Accordingly, for example, the number of functional groups of —COF is the sum of the number of functional groups determined from the absorption peak at an absorption frequency of 1,883 cm$^{-1}$ caused by —CF$_2$COF and the number of functional groups determined from the absorption peak at an absorption frequency of 1,840 an caused by —CH$_2$COF.

The functional groups are functional groups present at the end of the main chain or the end of the side chain of the copolymer, and present in the main chain or in the side chain. The number of functional groups may be the total number of —CF═CF$_2$, —CF$_2$H, —COF, —COOH, —COCCH$_3$, —CONH$_2$, and CH$_2$OH.

A chain transfer agent or a polymerization initiator used in producing a copolymer introduces the functional groups to the copolymer, for example. When an alcohol is used as a chain transfer agent, or a peroxide having the structure of —CH$_2$OH is used as a polymerization initiator, for example, —CH$_2$OH is introduced to the end of the main chain of the copolymer. Also, the polymerization of a monomer having a functional group introduces the functional groups to the end of the side chain of the copolymer.

By subjecting a copolymer having such functional groups to fluorination treatment, it is possible to obtain the copolymer having the number of functional groups within the above range. In other words, the copolymer used in the injection molding method of the present disclosure is preferably one subjected to fluorination treatment. Also, the copolymer used in the injection molding method of the present disclosure preferably has a —CF$_3$ terminal group.

It is possible to carry out the fluorination treatment by contacting a copolymer that has not been subjected to fluorination treatment with a fluorine-containing compound.

Examples of the fluorine-containing compounds include, but not limited to, fluorine radical sources that generate fluorine radicals under fluorination treatment conditions. Examples of the fluorine radical sources include F$_2$ gas, CoF$_3$, AgF$_2$, UF$_6$, OF$_2$, N$_2$F$_2$, CF$_3$OF, and halogen fluoride (e.g., IF$_5$, C$_1$F$_3$).

The fluorine radical source such as the F$_2$ gas may be in 100% concentration, but from the standpoint of safety, it is preferable to mix the fluorine radical source with an inert gas and dilute it to 5 to 50% by mass before use and more preferable to dilute it to 15 to 30% by mass before use. Examples of the inert gases include nitrogen gas, helium gas, and argon gas, and nitrogen gas is preferable from the economic standpoint.

The conditions of the fluorination treatment are not limited, and the copolymer in a molten state may be contacted with the fluorine-containing compound, but usually it is possible to carry out the fluorination treatment at the melting point of the copolymer or lower temperature, preferably at a temperature of 20 to 240° C., more preferably temperature of 80 to 240° C., and still more preferably temperature of 100 to 220° C. The fluorination treatment is generally carried out for 1 to 30 hours and preferably 5 to 25 hours. The fluorination treatment is preferably conducted by contacting a copolymer that has not been subjected to fluorination treatment is contacted with a fluorine gas ($F_2$ gas).

The copolymer used in the injection molding method of the present disclosure contains a tetrafluoroethylene unit and a fluoroalkyl vinyl ether unit. The copolymer used in the injection molding method of the present disclosure is a melt-fabricable fluororesin. Melt fabricable means that a polymer can be melted and processed using a conventional processing machine such as an extruder and an injection molding machine.

Examples of the FAVE constituting the FAVE unit mentioned above include at least one selected from the group consisting of a monomer represented by general formula (1):

$$CF_2=CFO(CF_2CFY^1O)_p-(CF_2CF_2CF_2O)_q-Rf \quad (1)$$

wherein $Y^1$ represents F or $CF_3$; Rf represents a perfluoroalkyl group having 1 to 5 carbon atoms; p represents an integer of 0 to 5; and q represents an integer of 0 to 5, and a monomer represented by general formula (2):

$$CFX=CXOCF_2OR^1 \quad (2)$$

wherein X is the same or different, and represents H, F, or $CF_3$; and $R^1$ represents a linear or branched fluoroalkyl group having 1 to 6 carbon atoms and optionally containing 1 to 2 atoms of at least one selected from the group consisting of H, Cl, Br and I, or a cyclic fluoroalkyl group having 5 or 6 carbon atoms and optionally containing 1 to 2 atoms of at least one selected from the group consisting of H, Cl, Br and I.

Among them, the FAVE is preferably the monomer represented by general formula (1), more preferably at least one selected from the group consisting of perfluoro(methyl vinyl ether), perfluoro(ethyl vinyl ether) (PEVE) and perfluoro(propyl vinyl ether) (PPVE), still more preferably at least one selected from the group consisting of PEVE and PPVE, and particularly preferably PPVE.

The content of the fluoroalkyl vinyl ether (FAVE) unit in the copolymer is preferably 1.0 to 10.0% by mass, more preferably 2.0% by mass or more, even more preferably 3.0% by mass or more, further preferably 3.5% by mass or more, and particularly preferably 4.0% by mass or more, and more preferably 8.0% by mass or less, even more preferably 7.0% by mass or less, particularly preferably 6.5% by mass or less, and most preferably 6.0% by mass or less, based on the total monomer unit. In the case where the content of the FAVE unit in the copolymer falls within the above range, it is possible to obtain an injection molded article having excellent compression-set resistance.

The content of the tetrafluoroethylene (TFE) unit in the copolymer is preferably 99.0 to 90.0% by mass, more preferably 98.0% by mass or less, even more preferably 97.0% by mass or less, further preferably 96.5% by mass or less, and particularly preferably 96.0% by mass or less, and more preferably 92.0% by mass or more, even more preferably 93.0% by mass or more, particularly preferably 93.5% by mass or more, and most preferably 94.0% by mass or more, based on the total monomer unit. In the case where the content of the TFE unit in the copolymer falls within the above range, it is possible to obtain an injection molded article having excellent compression-set resistance.

In the present disclosure, the content of each monomer unit in the copolymer is measured by the $^{19}$F-NMR method.

The copolymer can also contain a monomer unit derived from a monomer copolymerizable with TFE and FAVE. In this case, the content of the monomer copolymerizable with TFE and FAVE is, preferably 0 to 10% by mass and more preferably 0.1 to 2.0% by mass, based on the total monomer unit in the copolymer.

Examples of monomers copolymerizable with TFE and FAVE include HFP, a vinyl monomer represented by $CZ^1Z^2=CZ^3(CF_2)_nZ^4$, wherein $Z^1$, $Z^2$ and $Z^3$ are the same or different, and represent H or F; $Z^4$ represents H, F, or Cl; and n is an integer of 2 to 10, and an alkyl perfluorovinyl ether derivative represented by $CF_2=CF-OCH_2-Rf^1$, wherein $Rf^1$ represents a perfluoroalkyl group having 1 to 5 carbon atoms. Among them, HFP is preferred.

The copolymer is preferably at least one selected from the group consisting of a copolymer consisting only of a TFE unit and a FAVE unit and a TFE/HFP/FAVE copolymer, and more preferably a copolymer consisting only of a TFE unit and a FAVE unit.

The melting point of the copolymer is preferably 280 to 322° C., more preferably 285° C. or higher, and even more preferably 295° C. or higher, and more preferably 320° C. or lower, even more preferably 315° C. or lower, and particularly preferably 310° C. or lower, from the viewpoint of heat resistance. The melting point can be measured using a differential scanning calorimeter [DSC].

The glass transition temperature (Tg) of the copolymer is preferably 70° C. or higher, more preferably 80° C. or higher, even more preferably 85° C. or higher, further preferably 90° C. or higher, particularly preferably 95° C. or higher, and most preferably 100° C. or higher. The glass transition temperature can be measured by dynamic viscoelasticity measurement.

The melt flow rate of the copolymer is preferably 5 to 80 g/10 minutes, more preferably 10 g/10 minutes or more, and even more preferably 20 g/10 minutes or more, and more preferably 60 g/10 minutes or less, even more preferably 50 g/10 minutes or less, particularly preferably 40 g/10 minutes or less, and most preferably 30 g/10 minutes or less. In the case where the melt flow rate of the copolymer falls within the above range, it is possible to obtain an injection molded article having excellent compression-set resistance with high productivity.

In the present disclosure, the melt flow rate is a value obtained as a mass (g/10 minutes) of a polymer flowing out per 10 minutes from a nozzle having an inner diameter of 2.1 mu and a length of 8 mm under a 5 kg load at 372° C. using a melt indexer according to ASTM D1238.

The copolymer may be produced, for example, by appropriately mixing a monomer that will be a constituent unit thereof and an additive such as a polymerization initiator through a conventionally known method such as emulsion polymerization or suspension polymerization.

In the injection molding method of the present disclosure, the form of the copolymer supplied to the injection molding machine is not limited, and a copolymer in the form of powder, pellet, or the like may be used.

In the injection molding method of the present disclosure, by supplying other components other than a copolymer to the injection molding machine together with the copolymer, an injection molded article containing the copolymer and the other components may be obtained. Examples of the other components include a filling agent, a plasticizer, a pigment, a coloring agent, an antioxidant, a UV absorber, a flame retarder, an anti-aging agent, an antistatic agent, and anti-bacterial agent.

Among the other components, a filling agent is preferred. Examples of filling agents include silica, kaolin, clay, organized clay, talc, mica, alumina, calcium carbonate, calcium terephthalate, titanium oxide, calcium phosphate, calcium fluoride, lithium fluoride, cross-linked polystyrene, potassium titanate, carbon, boron nitride, a carbon nanotube, and a glass fiber.

In the case where the copolymer and other components are supplied into the injection molding machine, before supplying the composition to the injection molding machine, a composition containing the copolymer and the other components may be prepared in advance, and the obtained composition may be supplied into the injection molding machine. Examples of methods for producing the composition include a method of dry-mixing the copolymer and the other components and a method of mixing the copolymer and the other components in advance in a mixer, followed by melt-kneading in a kneader, a melt extruder, or the like.

In the injection molding method of the present disclosure, the mold to be used is a mold having a minimum thickness of the mold cavity of 0.8 mm or less and a total projected area of the mold of 1 $cm^2$ or more, as described above. The total projected area of the mold is preferably 4 $cm^2$ or more, more preferably 8 $cm^2$ or more, even more preferably 16 $cm^2$ or more, and particularly preferably 36 $cm^2$ or more. The total projected area of the mold may be 10,000 $cm^2$ or less, and may be 400 $cm^2$ or less. The mold used in the injection molding method of the present disclosure may be a one-piece mold or a multiple-piece mold.

The copolymer injected from a nozzle of the injection molding machine usually flows into a mold cavity through a sprue and a runner, and then through a gate to fill the mold cavity. Many molds have a runner and a gate famed along the perpendicular direction to the opening and closing direction (the direction of the parting plane) of the molds to form the mold cavity for forming the injection molded article.

The mold cavity is a space in the mold for filling the copolymer to form the injection molded article. The minimum thickness of the mold cavity is the minimum distance between the walls of the mold cavity that will form the thinnest wall part of the resulting injection molded article. The minimum thickness of the mold cavity is 0.8 mm or less, preferably 0.6 mm or less, and may be 0.1 mm or more.

In the present disclosure, the projected area of the mold is a projected area of the mold cavity viewed from the opening and closing direction of the mold, including the projected area of runners or gates, if foamed in the mold. In the present disclosure, the total projected area of the mold is a total projected area of the mold cavity, the runner, and the gate, and if there are multiple mold cavities, runners and gates, the total projected area of the mold is a total projected area of the multiple mold cavities, the multiple runners, and the multiple gates.

By using such a mold, it is possible to simultaneously produce a large number of small injection molded articles having a thin portion with a minimum product thickness of 0.8 mm or less and a projected product area of 1 to 36 $cm^2$.

Furthermore, by using such a mold, it is possible to produce large injection molded articles having a thin portion with a minimum product thickness of 0.8 mm or less and a projected product area of more than 36 $cm^2$ and preferably 400 $cm^2$ or more. In the present disclosure, the minimum product thickness refers to a thickness of the thinnest portion of the injection molded article. In the present disclosure, the projected product area refers to a projected area of the injection molded article viewed from the opening and closing direction of the mold.

The cross-sectional area of the sprue is preferably 1 to 60 $mm^2$. The form of the sprue is not limited and may be circular, rectangular, trapezoidal, or the like.

The cross-sectional area of the runner is preferably 1 to 60 $mm^2$. The form of the runner is not limited and may be circular, rectangular, trapezoidal, or the like. The runner system is not limited and may be a cold runner or a hot runner.

The cross-sectional area of the gate is preferably 0.1 to 30 $mm^2$. The gate system is not limited and may be a direct gate, a side gate, a submarine gate, or the like. The number of gates for each mold cavity is not limited. In other words, the mold may be a mold having a single-point gate structure or a mold having a multi-point gate structure.

The projected area per mold cavity for forming one injection molded article is preferably 1 to 36 $cm^2$. The width in the flow direction per mold cavity for forming one injection molded article is preferably 0.5 to 6 cm. The width in the flow vertical direction per mold cavity for forming one injection molded article is preferably 0.5 to 6 cm. The thickness per mold cavity for forming one injection molded article is preferably 0.4 to 5 mu. In addition, the proportion of the projected area of the part of the mold cavity with a thickness of 1 mu or less to the projected area of one mold cavity for forming one injection molded article is preferably 50% or more. The weight per injection molded article famed by one mold cavity is preferably 0.5 to 100 g.

The number of mold cavities (number of pieces taken) of the mold is preferably 1 to 64.

Examples of methods of removing the injection molded article from the mold cavity include, but not limited to, a method of removing the injection molded article using an ejector pin, sleeve, or the like.

Examples of materials of the mold used in the injection molding method of the present disclosure include, but not limited to, metals usually used in an injection molding machine for TFE/FAVE copolymers, such as pre-hardened steel, quenched and tempered steel, age-treated steel, and iron-based alloys. Since the injection molding method of the present disclosure suppresses corrosion of molds to a high degree, it is not necessary to use molds made of expensive corrosion resistant alloys such as Ni alloys including Hastelloy (R) and Inconel (R), and corrosion of molds can be suppressed even when metal molds made of metals usually used in an injection molding machine for TFE/FAVE copolymers are used.

Examples of pre-hardened steel include SC series, SCM series, and SUS series.

Examples of SC series include PXZ.

Examples of SCM series include HPM2, HPM7, PXS, and IMPAX.

Examples of SUS series include HPM38, HPM77, S-STAR, G-STAR, STAVAX, RAMAX-S, and PSL.

Examples of iron-based alloys include alloys described in Japanese Patent Laid-Open No. 2005-113161 and Japanese Patent Laid-Open No. 2005-206913.

The mold to be used may be a mold having an anti-corrosion coating famed on at least surface of the mold cavity, such as Cr, Ni, W, or Ni alloy.

The injection molded article obtained in the injection molding method of the present disclosure can be used for a variety of applications. For example, in a secondary battery, a small and thin sealing member such as a sealing gasket or a sealing packing is used to prevent leakage of liquid or gas, or ingress of liquid or gas from outside. Furthermore, in a secondary battery, a small and thin insulating member such as an insulating gasket or an insulating packing is used to insulate electricity. In the injection molding method of the present disclosure, it is possible to obtain a large number of thin injection molded articles while suppressing corrosion of the mold. Therefore, the injection molding method of the present disclosure enables to suitably produce a sealing member, an insulation member, and the like as an injection molded article.

The injection molding method of the present disclosure also enables to provide a large and thin injection molded article while suppressing corrosion of the mold. Therefore, the injection molding method of the present disclosure enables to suitably produce members for a semiconductor manufacturing apparatus or a substrate cleaning apparatus or housings thereof. Additionally, the injection molding method of the present disclosure enables to produce these members and housings with a projected area of 400 cm$^2$ or more in the injection direction, while suppressing corrosion of the mold.

The injection molding method of the present disclosure is also applicable to insert molding, multi-color molding, different material molding, decorative molding (film insert molding and film in-mold molding), injection compression molding, rapid heating and rapid cooling molding, and the like.

The embodiments are described above, but it will be understood that various changes in embodiments and details are possible without departing from the scope and spirit of the claims.

The present disclosure provides an injection molding method for obtaining an injection molded article using an injection molding machine by means of filling a mold cavity of a mold with a molten copolymer from a nozzle of the injection molding machine, wherein a minimum thickness of the mold cavity is 0.8 mm or less, and a total projected area of the mold is 1 cm$^2$ or more, and the copolymer is a copolymer containing a tetrafluoroethylene unit and a fluoroalkyl vinyl ether unit, wherein the number of functional groups is 100 or less per 10$^6$ main-chain carbon atoms of the copolymer.

In the injection molding method of the present disclosure, the total projected area of the mold is preferably 400 cm$^2$ or less.

In the injection molding method of the present disclosure, a temperature of the copolymer is preferably 370° C. or higher at the nozzle of the injection molding machine.

In the injection molding method of the present disclosure, a cylinder temperature of the injection molding machine is preferably 350° C. or higher.

In the injection molding method of the present disclosure, a melting point of the copolymer is preferably 295 to 320° C.

In the injection molding method of the present disclosure, a melt flow rate of the copolymer is preferably 5 to 80 g/10 minutes.

In the injection molding method of the present disclosure, a content of the fluoroalkyl vinyl ether unit in the copolymer is preferably 1.0 to 10.0% by mass based on the total monomer unit.

In the injection molding method of the present disclosure, the fluoroalkyl vinyl ether unit is preferably a perfluoro (propyl vinyl ether) unit.

In the injection molding method of the present disclosure, a minimum product thickness of the injection molded article is preferably 0.8 mm or less, and a projected product area of the injection molded article is preferably 1 to 36 cm$^2$.

In the injection molding method of the present disclosure, the injection molded article is preferably a sealing member or an insulating member.

EXAMPLES

Next, the embodiments of the present disclosure will be described with examples, but the present disclosure is not limited to such examples.

Each value in Examples were measured by the following method.

(Content of Monomer Unit)

The content of each monomer unit was measured by an NMR analyzer (e.g., AVANCE 300 high-temperature probe, manufactured by Bruker BioSpin).

(Melt Flow Rate (MFR))

The mass of polymer flowing out of a nozzle with an inner diameter of 2.1 mm and a length of 8 mm per 10 minutes (g/10 minutes) under a 5 kg load at 372° C. was determined using a melt indexer G-01 (manufactured by Toyo Seiki Seisaku-sho, Ltd.) according to ASTM D1238.

(Melting Point)

The melting point was determined as the temperature corresponding to the maximum value in the heat-of-fusion curve when the temperature was raised at a rate of 10° C./min using a differential scanning calorimeter (product name: X-DSC7000, manufactured by Hitachi High-Tech Science Corporation).

(Number of Functional Groups)

Pellets of the copolymer were molded by cold pressing to obtain a film with a thickness of 0.25 to 0.3 mm. This film was scanned 40 times by a Fourier transform infrared spectrometer [FT-IR (Spectrum One, manufactured by PerkinElmer Co., Ltd.)] and analyzed to obtain an infrared absorption spectrum, and a difference spectrum against a base spectrum that is completely fluorinated and has no functional groups was obtained. From the absorption peak of a specific functional group appearing in this difference spectrum, the number of functional groups N per 1×10$^6$ carbon atoms in the sample was calculated according to the following formula (A).

$$N = I \times K/t \tag{A}$$

I: Absorbance
K: Correction coefficient
t: Thickness of film (mm)

For reference, Table 2 shows the absorption frequency, the molar absorption coefficient, and the correction coefficient for the functional groups in the present disclosure. Furthermore, the molar absorption coefficients were determined from FT-IR measurement data of low molecular weight model compounds.

TABLE 2

| Functional Group | Absorption Frequency (cm$^{-1}$) | Molar Extinction Coefficient | Correction Factor | Model Compound |
|---|---|---|---|---|
| —COF | 1883 | 600 | 388 | $C_7F_{15}COF$ |
| —COOH free | 1815 | 530 | 439 | $H(CF_2)_6COOH$ |
| —COOH bonded | 1779 | 530 | 439 | $H(CF_2)_6COOH$ |
| —COOCH$_3$ | 1795 | 680 | 342 | $C_7F_{15}COOCH_3$ |
| —CONH$_2$ | 3436 | 506 | 460 | $C_7H_{15}CONH_2$ |
| —CH$_2$OH$_2$, —OH | 3648 | 104 | 2236 | $C_7H_{15}CH_2OH$ |
| —CF$_2$H | 3020 | 8.8 | 26485 | $H(CF_2CF_2)_3CH_3OH$ |
| —CF=CF$_2$ | 1795 | 635 | 366 | $CF_2$=$CF_2$ |

Metal Content>

To determine the total metal content in the copolymer, the pellets were weighed in a platinum crucible and successively ashed in a burner and an electric furnace. The ashes were decomposed by heating with nitric acid and treated with dilute nitric acid to make a constant volume. The platinum dish was washed with dilute nitric acid and the washed liquid was analyzed by ICP optical emission spectroscopy (ICP mass spectrometer, Agilent 8800, manufactured by Agilent Technologies, Inc.). Note that in the measurement of metal content, there is a detection limit for each metal component. For a metal component having metal content less than the detection limit, the detection limit was added to the total amount of the metal content.

A low metal content copolymer as such may be produced, for example, by using the production method described in the Japanese patent application (Japanese Patent Application No. 2019-30428) by the present applicant.

(Metal Corrosion Test)

In a glass container (50 ml screw tube), 20 g of the copolymer below was placed, and a metal post (5-nm square quadrilateral faun, 30 mm long) famed by HPM38 (Cr plating) or HPM (Ni plating) was hung in the glass container so as not to be in contact with the copolymer. The glass container was then covered with a lid made of an aluminum foil. The glass container was placed in an oven as is and heated at 380° C. for 3 hours. Thereafter, the heated glass container was removed from the oven and cooled down to room temperature prior to visual observation of the degree of corrosion on the surface of the metal post. The degree of corrosion was judged according to the follow criteria.

Good: no corrosion observed
Fair: corrosion slightly observed
Poor: corrosion observed Example 1

The copolymer (I) was used to carry out the metal corrosion test. Table 3 shows the results.

Copolymer (I): tetrafluoroethylene/fluoroalkyl vinyl ether copolymer (formulation: TFE/PPVE=94.4/5.6 (wt %), number of functional groups: 4/10$^6$ C, melting point: 303° C., MFR: 30.9 g/10 minutes, metal content: less than 79 ng/1 g Comparative Example 1

The copolymer (II) was used to carry out the metal corrosion test. Table 3 shows the results.

Copolymer (II): tetrafluoroethylene/fluoroalkyl vinyl ether copolymer (formulation: TFE/PPVE=94.4/5.6 (wt %), number of functional groups: 303/10$^6$C, melting point: 303° C., MFR: 26.1 g/10 minutes), metal content: less than 75 ng/1 g

TABLE 3

|  | Example 1 | Comparative Example 1 |
|---|---|---|
| HPM38 Cr plating | Good | Poor |
| HPM38 Ni plating | Good | Poor |

FIG. 1 shows photographs of metal posts before and after the metal corrosion test. The photographs in FIG. 1 are each photographs of the following metal posts:

(a1) a photograph of the metal post (HPM38 (Cr plating)) before the metal corrosion test,
(a2) a photograph of the metal post (HPM38 (Ni plating)) before the metal corrosion test,
(b1) a photograph of the metal post (HPM38 (Cr plating)) after the metal corrosion test conducted in Comparative Example 1,
(b2) a photograph of the metal post (HPM38 (Ni plating)) after the metal corrosion test conducted in Comparative Example 1,
(c1) a photograph of the metal post (HPM38 (Cr plating)) after the metal corrosion test conducted in Example 1, and
(c2) a photograph of the metal post (HPM38 (Ni plating)) after the metal corrosion test conducted in Example 1.

Example 2

Figure 2A:
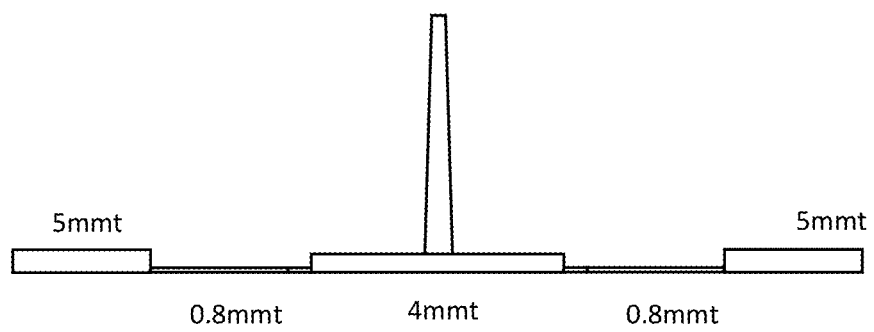
FIG. 2A is a schematic front view of a mold used in Example 2.
Figure 2B:
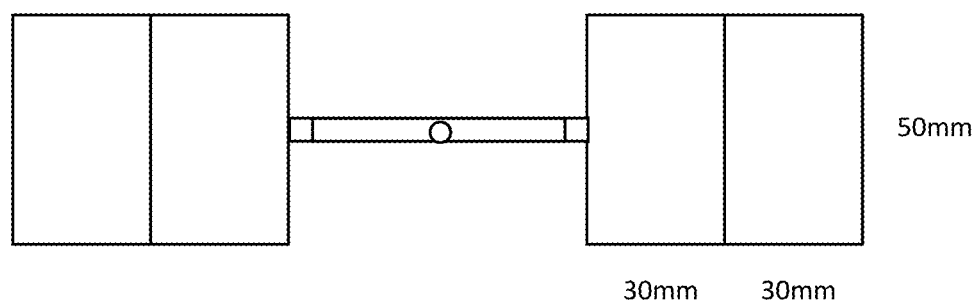
FIG. 2B is a schematic plan view of a mold used in Example 2.

An injection molding machine (MD75XA, manufactured by NIIGATA MACHINE TECHNO Co., Ltd.) was employed to inject and mold the copolymer (I) with the cylinder temperature of 350 to 385° C. and the mold temperature of 160 to 200° C. The mold to be used was a mold made of HPM38 with Cr plating (minimum thickness of 0.8 mm, projected area of 63 cm$^2$). FIG. 2A is a schematic front view of the mold used, and FIG. 2B is a schematic plan view of the mold.

As a result, an injection molded article with beautiful appearance was obtained. In addition, there was no corrosion observed in the mold used.

Example 3

Figure 3A:
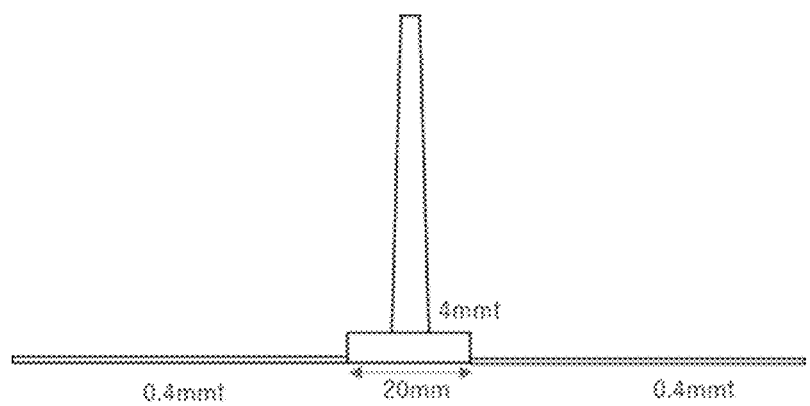
FIG. 3A is a schematic front view of the mold used in Example 3.
Figure 3B:
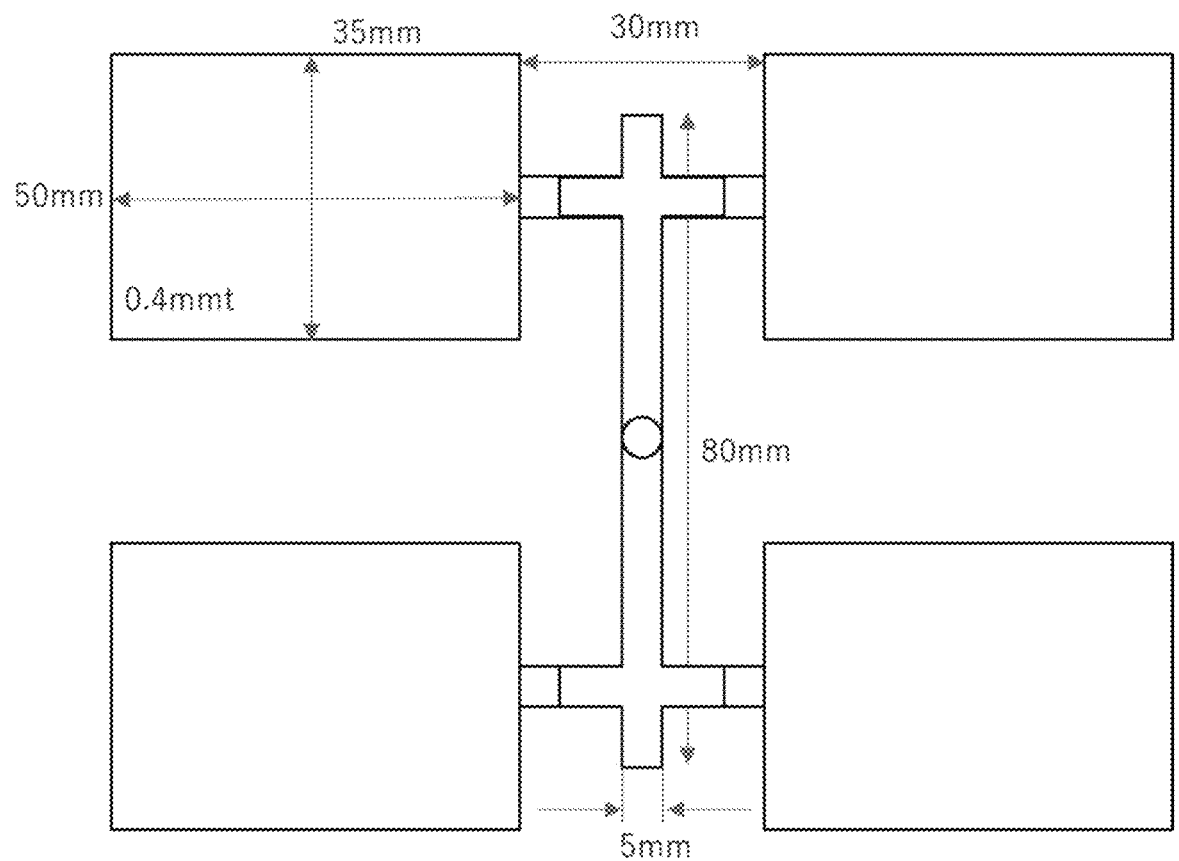
FIG. 3B is a schematic plan view of the mold used in Example 3.

The copolymer (III) was used.
Copolymer (III): tetrafluoroethylene/fluoroalkyl vinyl ether copolymer (formulation: TFE/PPVE=93.0/7.0 (wt %), number of functional groups: 0/10$^6$C, melting point: 300° C., MFR: 72.8 g/10 minutes, metal content: less than 79 ng/1 g An injection molding machine (SE5OEV-A, manufactured by Sumitomo Heavy Industries, Ltd.) was employed to inject and mold the copolymer (III) with the cylinder temperature of 350 to 385° C. and the mold temperature of 150 to 200° C. The mold to be used was a mold made of HPM38 with Cr plating (minimum thickness of 0.4 mm, projected area of 74.5 cm²). FIG. 3A is a schematic front view of the mold used, and FIG. 3B is a schematic plan view of the mold.

As a result, an injection molded article with beautiful appearance was obtained. In addition, there was no corrosion observed in the mold used.

The invention claimed is:

1. An injection molding method for obtaining an injection molded article using an injection molding machine by means of filling a mold cavity of a mold with a molten copolymer from a nozzle of the injection molding machine, wherein
a minimum thickness of the mold cavity is 0.8 mm or less, where the minimum thickness of the mold cavity is a distance between walls of the mold cavity that will form a thinnest wall part of the injection molded article,
a total projected area of the mold is 1 cm² or more, and
the copolymer is a copolymer containing a tetrafluoroethylene unit and a fluoroalkyl vinyl ether unit, wherein the number of functional groups is 100 or less per $10^6$ main-chain carbon atoms of the copolymer and a melt flow rate of the copolymer is 20 g/10 minutes or more.

2. The injection molding method according to claim 1, wherein the total projected area of the mold is 400 cm² or less.

3. The injection molding method according to claim 1, wherein a temperature of the copolymer is 370° C. or higher at the nozzle of the injection molding machine.

4. The injection molding method according to claim 1, wherein a cylinder temperature of the injection molding machine is 350° C. or higher.

5. The injection molding method according to claim 1, wherein a melting point of the copolymer is 295 to 320° C.

6. The injection molding method according to claim 1, wherein a melt flow rate of the copolymer is 20 to 80 g/10 minutes.

7. The injection molding method according to claim 1, wherein a content of the fluoroalkyl vinyl ether unit in the copolymer is 1.0 to 10.0% by mass based on the total monomer unit.

8. The injection molding method according to claim 1, wherein the fluoroalkyl vinyl ether unit is a perfluoro (propyl vinyl ether) unit.

9. The injection molding method according to claim 1, wherein a minimum product thickness of the injection molded article is 0.8 mm or less, and a projected product area of the injection molded article is 1 to 36 cm².

10. The injection molding method according to claim 1, wherein the injection molded article is a sealing member or an insulating member.

11. The injection molding method according to claim 1, wherein the minimum thickness of the mold cavity is 0.1 mm to 0.8 mm.

* * * * *